United States Patent [19]

Jorgensen et al.

[11] Patent Number: 5,480,272
[45] Date of Patent: Jan. 2, 1996

[54] CHASING TAP WITH REPLACEABLE CHASERS

[75] Inventors: Glenn F. Jorgensen, Ridgewood, N.J.; Michael W. Kelly, Joliet, Ill.

[73] Assignees: Power House Tool, Inc., Joliet, Ill.; JNT Technical Services, Inc., Little Ferry, N.J.

[21] Appl. No.: 237,298

[22] Filed: May 3, 1994

[51] Int. Cl.⁶ .................................................. B23G 5/14
[52] U.S. Cl. .......................... 408/222; 408/233; 408/713; 470/200
[58] Field of Search ................................ 408/215–222, 408/231–233, 713; 470/198, 200

[56] References Cited

U.S. PATENT DOCUMENTS

| | | | |
|---|---|---|---|
| 171,795 | 1/1876 | Grant | 408/222 |
| 2,227,281 | 12/1940 | Smith | 408/222 |
| 2,864,102 | 12/1958 | Budnick. | |
| 3,812,547 | 5/1974 | Reich. | |
| 4,531,863 | 7/1985 | Smith | 407/113 |
| 5,112,162 | 5/1992 | Hartford et al. | 407/41 |

FOREIGN PATENT DOCUMENTS 000264822  4/1988  European Pat. Off. ............... 470/189

*Primary Examiner*—Steven C. Bishop
*Attorney, Agent, or Firm*—Hill, Steadman & Simpson

[57] ABSTRACT

A thread cutting tool which can be configured to cut threads in a variety of bore sizes using universal thread cutting chasers mounted in select radial extension such as by using variable length tool blocks which are themselves interfit within retaining slots in the head portion of the tool, or by providing alternate radial position notches an the head portion for mounting the cutting chasers. By using variable tool blocks mounted to the head portion of the tool, universal thread cutting chasers having a preselected thread pitch can be utilized for multiple bore sizes, thus saving the expense of providing chasers or head portions corresponding to each bore size. Alternately, by providing alternate radial position notches in the head portion for mounting the cutting chasers, a single tool can be used for different bore sizes, such as for undertaking a start thread cut in a bore and then undertaking a finish thread cut in the pre-cut bore using an alternate radial position for the chasers.

24 Claims, 2 Drawing Sheets

FIG. 5
FIG. 6
FIG. 7
FIG. 8
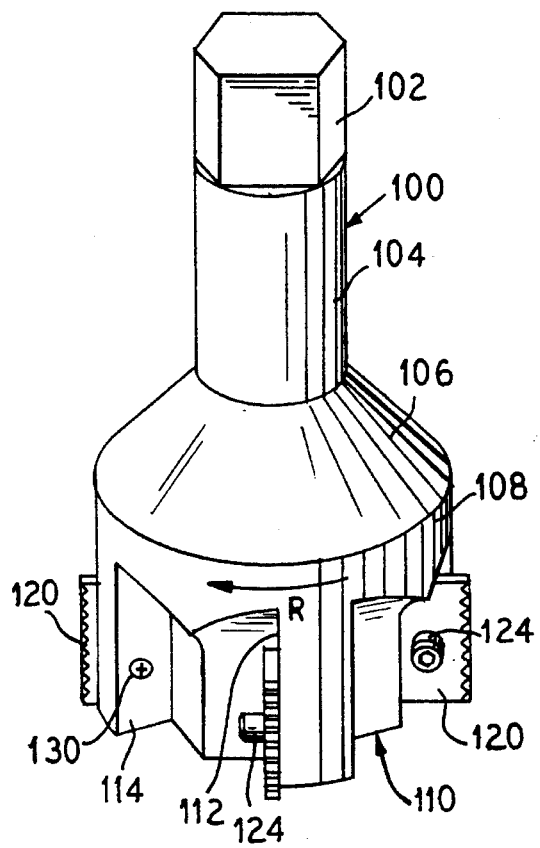
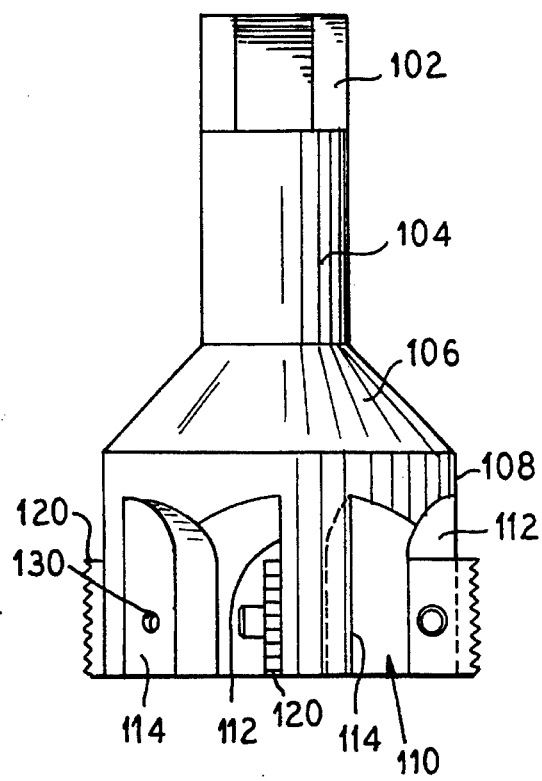
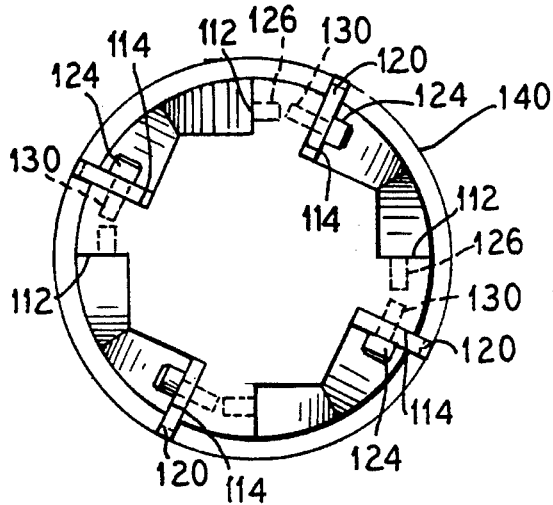

CHASING TAP WITH REPLACEABLE CHASERS

BACKGROUND OF THE INVENTION

The present invention relates to a hole threading tap or a "chasing tap" and in particular relates to a chasing tap with replaceable thread cutting heads or "chasers".

It is known to provide a die head for a quick change chaser, such as disclosed in U.S. Pat. No. 2,864,102. In this patent, a longitudinal cylindrical die body is provided with longitudinally extending recesses around its outer periphery in which individual chasers are clamped. A removable sleeve is provided which, by camming action, locks the chasers into the die body recesses for performing a cutting operation.

U.S. Pat. No. 3,812,547 describes a tool holder with interchangeable inserts for a tangent chaser. Interchangeable threading dies for an automatic self-opening tangent threading die head permit a range of thread pitches and diameters to be cut with a single die head.

U.S. Pat. No. 4,531,863 relates to a thread-cutting apparatus which includes an indexable insert having multiple thread-cutting profiles.

U.S. Pat. No. 5,112,162 describes a thread-milling cutter assembly. The assembly includes a cutting tool comprised of tool hardened steel having a holder end and an opposite end. A series of axially extending slots are provided on the tool on an outer circumference of the opposite end. A series of cutter bits are mounted in the slots and bottomed on the jig ground pins positioned at the radially inner end of the associated slot. A wedge-shaped shim is used to hold the replaceable cutter bit in place.

One of the drawbacks of the aforementioned prior art is that the head portions or tool holding portions of the chaser assemblies do not provide the flexibility of using universal or standard threading chasers or head portions for a variety of bore diameters.

SUMMARY OF THE INVENTION

It is an object of the present invention to provide a chasing tap with replaceable chasers to maintain flexibility of applications for different diameter bores as well as to replace worn chasers. Additionally, it is object of the invention to provide replaceable tool blocks for holding the chasers to allow the same tool chasers having the particular thread pitch desired to be used for varying diameter bores. It is an object of the invention to provide an assembly wherein the head portion or chaser holder can be used for a variety of bore sizes. It is an object of the invention to provide a head portion with the flexibility to mount a set of chasers in two different positions of different radial extension, i.e., providing two different cutting circumferences. This is beneficial to first cut threads with a cutting circumference between the minor and major thread diameters, then moving the chasers to a second radial position to finish the threads by cutting at the major thread diameter.

The objects are inventively achieved in that a tap assembly is provided having a stem portion connecting a square or hex shaped drive end to an enlarged head portion. The enlarged head portion provides a plurality of dovetail slots spaced apart radially and having exposed ends closeable by an end cap. Tool blocks having complementary shaped dovetail bases are interfit into the slots and retained by the end cap. The tool blocks extend radially outwardly from the head portion. The tool blocks comprise a chaser slot for receiving a chaser therein, the chaser extending radially, and a set screw for locking the chaser in place. Thus, the tap assembly can be used for a variety of bore sizes by replacing the tool blocks with radially shorter or longer tool blocks, and the thread pitch can be changed out by replacing the chasers in the tool blocks.

Alternatively, a head portion can be provided with two sets of chaser holding attachment points, the attachment points allowing for different radial extension of universal chasers. The head position can provide a first set of notches or slots for holding chasers at a first radial position corresponding to a cutting circumference between the minor and major diameters of the threads to be cut. Then the chaser can be moved to second radial positions to finish the thread. The second radial positions can also be notches or slots angularly offset from the first radial positions. Set screws can be used to secure the chasers within the slots or notches.

BRIEF DESCRIPTION OF THE DRAWINGS

FIG. 5 is a perspective view of an alternate embodiment of a tap assembly;

FIG. 6 is an elevational view of the tap assembly of FIG. 5;

FIG. 7 is a bottom view of the tap assembly of FIG. 5; and

FIG. 8 is a bottom view of the tap assembly of FIG. 5 with tap chasers rearranged in alternate positions.

DETAILED DESCRIPTION OF THE PREFERRED EMBODIMENTS

Figure 1:
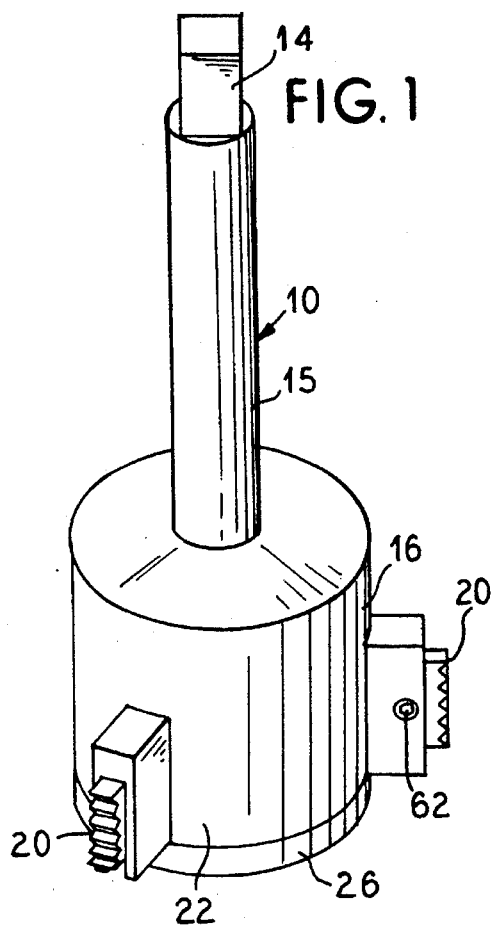
FIG. 1 is a perspective view of a tap assembly of the present invention.
Figure 3:
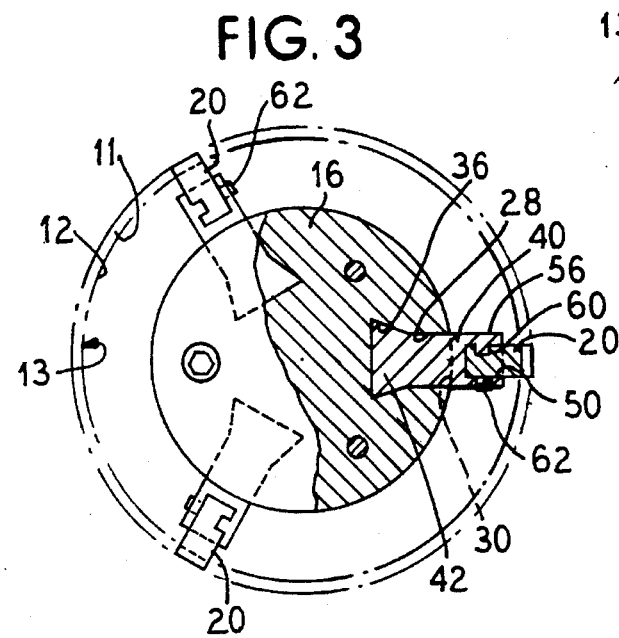
FIG. 3 is a bottom view of the tap assembly of FIG. 1 in partial section.

FIG. 1 illustrates a tap assembly 10 for cutting threads 11 into a sidewall 12 of a bore 13 (shown in FIG. 3). The tap assembly 10 includes a square or hex drive end portion 14 connected to a stem 15 which is connected at an opposite end to a head portion 16. The head portion 16 holds thread cutting chasers 20 extending radially therefrom and arranged spaced at 120° angles. A different number of chasers 20 at different angular spacing is also possible and encompassed by the present invention.

Figure 2:
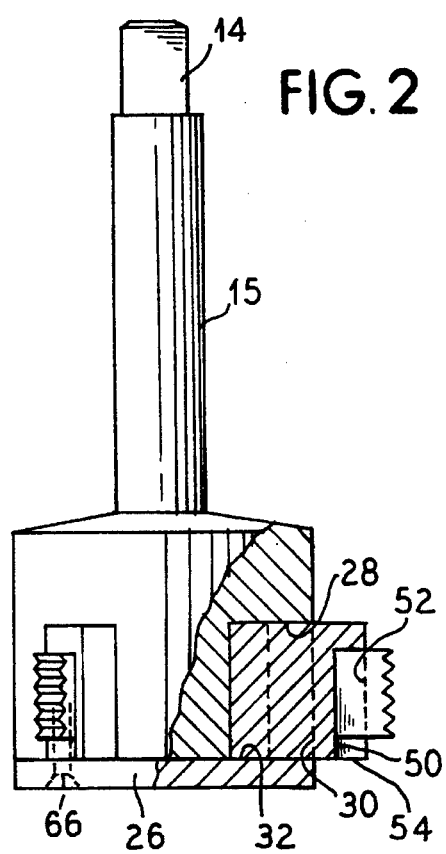
FIG. 2 is an elevational view of the tap of FIG. 1 in partial section.

The head portion 16 has an outer perimeter 22 greater than an outer perimeter of the stem 15. Arranged at an end of the head portion 16 opposite the stem 15 is a cap 26. As illustrated in FIGS. 2 and 3 the head portion provides slots 28 which have a radially open face 30 and an axially open face 32. The slots 28 further provide a dovetail portion 36. Interfit within the slots 28 are tool blocks 40 having a cross-sectional profile to conform to the shape of the slots 28.

The tool blocks 40 each have a dovetail portion 42 which interfits into the dovetail portion 36 of the slot 28. The tool blocks 40 are inserted into the slot 28 through the axially open face 32 with the cap 26 removed. The reinstallation of the cap 26 locks the tool blocks 40 within the slots 28. The tool blocks 40 extend radially outwardly and have chaser slots 50 formed therein with a radially open face 52 and an axially open face 54. Inside the chaser slot 50 and extending tangentially with respect to the head portion 16 are arranged ribs 56 which are elongate in an axial direction. The chaser 20 provides an axially extending slot 60 having at least one axially open face. The chaser 20 is thus slid into the chaser slot 50 through the open axial face 54 and the slot 60 receives the rib 56 at its open axial face and the chaser slides onto the rib 56. The rib 56 and slot 60 interface prevent the chaser 20 from moving in a radial direction. A set screw 62 oriented tangentially and in opposition to the rib 56 can be tightened to secure the chaser 20 within the chaser slot 50. The cap 26 is installed by a plurality of cap screws 66 and once installed, holds the three tool blocks in place.

Figure 4:
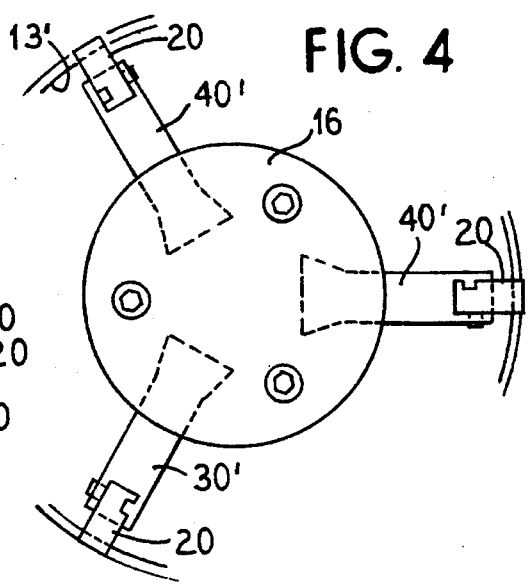
FIG. 4 is a bottom view of an alternate configuration for the tap assembly of FIG. 3.

As shown in FIG. 3 the tool blocks 40 and the chasers 20 are selected for a first bore 13. However, according to the invention, if a second larger bore 13' (shown partially in FIG. 4) is selected to be tapered, replacement tool blocks 40' can be installed and the chasers 20 having a preselected thread pitch are locked correspondingly thereto. It is an advantage of the invention that a chaser 20 having a specified thread pitch can be used for multiple bore diameters. The advantage is that for going from a smaller bore 13 to a larger bore 13', longer tool blocks 40' can be installed rather than using a larger diameter head portion which would hold the chasers, or longer chasers, which, being precisely machined, would increase production cost.

FIG. 5 illustrates a tap assembly 100 having a polygonal drive end 102 connected by a shaft 104 to a head portion 106. The head portion 106 has an outer circumference 108. At a plurality of positions around the circumference 108 are formed, cut or milled notches 110.

For a typical right handed screw thread, the tap assembly 100 would rotate in the direction "R". According to this orientation, and viewing FIG. 5, the notches 110 provide a right side radially orientated wall 112 and a left side radially orientated wall 114. The notches 110 are cut such that the right side radial wall 112 is shallower than the left side radial wall 114 as shown in FIG. 7. Shown attached to the plurality of right side radial walls 112 are thread cutting chaser inserts 120 secured to the right side radial wall 112 by a set screw 124 threaded into a bore 126. Left side radial walls 114 comprise threaded bores 130 for mounting the chaser inserts 120 to the left side radial walls 114 as shown in FIG. 8.

In operation, a single set of chaser inserts 120 are first installed onto the left hand radial walls as shown in FIG. 8 which are deeper than the right hand radial walls 112. Thus, a cutting circumference 140 is defined which is selected to be between the minor thread diameter and the major thread diameter of the bore to be thread cut. Advantageously, the cutting circumference 140 approximates the minor thread diameter. Since the cut end diameter 140 is reduced from the major thread diameter, a "starting thread cut" can be first made into the bore which requires less turning force on the tap and the possibility of fouled or distorted threads is reduced. After the starting threads are cut, either along the entire length of the bore to be threaded or by a small number of starting threads, the set of inserts 120 are removed from the left side radial wall 114 and installed on the shallower right side radial wall 112 as shown in FIG. 7 which now define a larger cutting circumference 142 corresponding to the major diameter of the threads to be cut.

Thus, the orientation of the inserts in FIG. 7 represents a thread finishing position. The tap assembly 100 can then be re-engaged to the threads cut in the starting position of FIG. 8 and cut even deeper to the finished major diameter. The number of notches 110 for tap assemblies 100 can vary, and it is typically 3 to 26 depending on the diameter of the bore to be threaded. While the invention provides the advantage that a single set of inserts 120 can be used in two positions to perform a starting thread cut and a finishing thread cut the invention also encompasses other variations such as the use of two sets of chaser inserts mounted at different axial levels of the head portion 106. Additionally, in operation, it is possible that the inserts 120 can remain in the thread starting position of FIG. 8 and a second set of inserts can then be installed in the finishing position of FIG. 7 without the need to remove the inserts which are mounted on the left hand walls 114 since these inserts will be radially retracted inwardly and should not affect the finish cutting.

By providing a two stage cutting of threads in the bore, the force required for the tapping during any one phase is reduced and the possibility of stripping or fouling the threads being cut is also reduced. This is particularly advantageous for large bore thread cutting operations where the force required for cutting the threads is great.

As is apparent from the foregoing specification, the invention is susceptible of being embodied with various alternations and modifications which may differ particularly from those that have been described in the preceding specification and description. It should be understood that we wish to embody within the scope of the paten warranted hereon all such modifications as reasonably and properly come within the scope of our contribution to the art.

We claim as our invention:

1. A tool, comprising:
    a shaft portion;
    a head portion connected to said shaft portion;
    a plurality of thread chasers having thread cutting teeth, each thread chaser extending radially from said head portion and being removably and replaceably connected thereto; and
    means for adjusting a radial position of said chasers relative to said head portion of said tool defining at least two cutting circumferences.

2. The tool according to claim 1 including a plurality of tool blocks extending radially from said head portion and said thread chasers being replaceably connected to extend radially from said tool blocks, wherein each of said tool blocks comprises a dovetail shaped base end and said head portion comprises an axial elongate dovetail cross-sectional shaped slot having a axially open face, said dovetail portion of said tool block slidable into said open face of said slot to be held therein and extend radially thereout; and means for retaining said tool block within said dovetail slot.

3. The tool according to claim 2 wherein said means for retaining comprises a cap attached to said head portion to cover said open faces of said dovetail slots with the tool block retained therein.

4. The tool according to claim 2, wherein said means for adjusting a radial position of said chasers comprises a plurality of sets of tool blocks, each set having a different radial dimension so as to position said chasers at a different radial distance from said head portion.

5. A tool comprising:
    a shaft portion;
    a head portion connected to said shaft portion;
    a plurality of thread Chasers having thread cutting teeth, each thread chaser extending radially from said head portion and being removably and replaceably connected thereto;
    means for adjusting a radial position of said chasers relative to said head portion of said tool;

a plurality of tool blocks extending radially from said head portion and said thread chasers being connected to extend radially from said tool blocks, wherein each of said tool blocks comprises a dovetail shaped base end and said head portion comprises an axial elongate dovetail cross-sectional shaped slot having a axially open face, said dovetail portion of said tool block slidable into said open face of said slot to be held therein and extend radially thereout; and means for retaining said tool block within said dovetail slot; and wherein said tool blocks comprise axially arranged chaser slots at distal ends thereof, sized and configured to hold said chasers partially therein to protrude radially thereout.

6. The tool according to claim 5, wherein said chaser slots comprise a retaining rib therein elongated in an axial direction and said chasers comprise a corresponding retaining slot which registers with said retaining rib when said chaser is slid into said chaser slot.

7. The tool according to claim 1, wherein said head portion has a plurality of chasers receiving pockets, with some of said pockets having means associated therewith for holding chasers received therein at a different radial position than others of said pockets.

8. A tapping tool having comprising:

a first plurality of tool blocks each having means for mounting a thread cutting chaser thereto;

a second plurality of tool blocks each having means for mounting said thread cutting chaser thereto;

a head portion having means for mounting one of said first plurality or said second plurality of tool blocks thereto in an angularly spaced apart fashion, said one plurality of tool blocks holding said chasers extending radially from said head portion, said first plurality of tool blocks having a cutting circumference when installed smaller than a cutting circumference of said second plurality of tool blocks when installed.

9. The tapping tool according to claim 8, wherein said means for mounting said tool blocks comprises tool block slots having open axial and radial faces and said tool blocks having a cross-sectional shape to closely fit within said tool block slots when axially slid into said slots, and means for retaining said tool blocks within said slots.

10. The tapping tool according to claim 9, wherein said means for mounting said thread cutting chasers of both said first and second plurality of tool blocks comprises a recess for receiving a portion of said thread cutting chaser and a set screw proceeding into said recess to lock said chaser therein.

11. The tapping tool according to claim 8 further comprising a shaft proceeding axially from said head portion and providing at an end remote from said head portion a polygonal tool engaging region.

12. A thread forming tool, comprising:

a head portion;

a plurality of tool blocks replaceably connected to said head portion;

a plurality of cutting chasers replaceably connected to said tool blocks, said tool blocks and said chasers mounted for radial orientation of said chasers; and a second plurality of tool blocks installable as replacements to the said first plurality of tool blocks, said second plurality of tool blocks having a longer radial dimension than said first plurality of tool blocks, said second plurality of tool blocks configured to hold said thread cutting chasers in a radial orientation.

13. The thread cutting tool according to claim 12, wherein said first and second plurality of tool blocks have chaser holding slots at a radial and thereof, and set screws proceeding into said chaser holding slots, said chaser holding slots configured to hold a portion of said chaser therein and said screw fixing said chaser therein.

14. The thread cutting tool according to claim 12, wherein said head portion comprises axially arranged tool block slots having open radial and axial faces and said tool blocks are mounted to said head portion by axially sliding into said tool block slots.

15. The thread cutting tool according to claim 14, wherein said tool block slots are configured having a broadened closed radial end and said tool blocks are formed to closely conform to an inside of said tool block slots.

16. The thread cutting tool according to claim 15 further comprising a cap fastened to an end of said head portion to cover said open axial face of said tool block slots.

17. A thread cutting tool, comprising:

a plurality of thread chasers having thread cutting teeth;

a head portion having means for mounting said chasers to extend radially outwardly at at least two alternate positions of radial extent to define at least two different cutting circumferences.

18. The thread cutting tool of claim 17, wherein said means for mounting comprises a plurality of alternate length tool blocks, one of each of said tool blocks replaceably mounting one said chaser to said head portion.

19. The thread cutting tool according to claim 17, wherein said means for mounting comprises alternate attachment positions arranged on said head portion, said positions defining at least a first radial extent and a second radial extent of said chasers.

20. The thread cutting tool according to claim 19, wherein said attachment positions comprise notches formed around a circumference of said head portion, said notches having a first shallower radial wall and a second deeper radial wall to which said chasers are selectively mounted.

21. The thread cutting tool according to claim 20, wherein said means for mounting comprises set screws to attach said chasers to said shallower and deeper radial walls.

22. A method of cutting threads in a select size bore comprising the steps of:

providing a cutting tool having a head portion;

providing means associated with said head portion for attaching thread cutting chasers at spaced apart positions around its perimeter, said chasers extending radially outward, said means allowing a selection of radial extent of said chasers corresponding to the select size bore to be thread cut;

installing said chasers to said means at a select radial extension;

installing said head portion into said bore;

rotating said head portion to cut said threads.

23. The method of claim 22 comprising the further steps of:

after cutting said threads along a length of said bore, removing said chasers from said means and reinstalling to said means at a greater radial outward extent; and recutting along the threads along said length to a deeper extent to form finish threads.

24. The method of claim 23 wherein said step of installing said chasers is further defined in that said select radial extension corresponds to approximately a minor diameter of said finish threads.

* * * * *